United States Patent
Yamamoto et al.

(10) Patent No.: US 7,277,259 B2
(45) Date of Patent: Oct. 2, 2007

(54) MAGNETIC HEAD ACTUATOR INCLUDING PIEZOELECTRIC ELEMENTS FIXED TO THE ARMS OF A FIRED GLASS-CERAMIC SUBSTRATE

(75) Inventors: Yutaka Yamamoto, Niigata-ken (JP); Jun-ichi Murakami, Niigata-ken (JP); Hiroya Sawairi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 440 days.

(21) Appl. No.: 10/773,720

(22) Filed: Feb. 6, 2004

(65) Prior Publication Data
US 2004/0160703 A1 Aug. 19, 2004

(30) Foreign Application Priority Data
Feb. 7, 2003 (JP) ............................. 2003-030258

(51) Int. Cl.
*G11B 5/54* (2006.01)
*G11B 21/10* (2006.01)

(52) U.S. Cl. .................. 360/294.4; 360/294.1
(58) Field of Classification Search ......... 360/294.4, 360/294.1
See application file for complete search history.

(56) References Cited
U.S. PATENT DOCUMENTS 6,088,204 A * 7/2000 Farrow et al. .............. 360/327
6,181,517 B1 * 1/2001 Yanagisawa et al. ..... 360/235.4
6,376,964 B1   4/2002 Young et al.
6,690,551 B2 * 2/2004 Shiraishi et al. .......... 360/294.4
6,724,580 B2 * 4/2004 Irie et al. ................. 360/294.4
6,751,069 B2 * 6/2004 Yao et al. ................. 360/294.4
6,851,120 B2 * 2/2005 Crane et al. ................ 720/674
6,870,709 B2 * 3/2005 Shimanouchi et al. ... 360/294.4
7,023,668 B2 * 4/2006 Ota et al. ................. 360/294.4
7,064,401 B2 * 6/2006 Uchiyama et al. .......... 257/415

FOREIGN PATENT DOCUMENTS

JP       61-131229       6/1986
JP       2002-74871      3/2002

OTHER PUBLICATIONS

Tummata, Rao R., "Ceramic and Glass-Ceramic Packaging in the 1990s," J. Am. Ceram. Soc., 74[5], pp. 895-908, 1991.

* cited by examiner

*Primary Examiner*—Jefferson Evans
(74) *Attorney, Agent, or Firm*—Brinks Hofer Gilson & Lione

(57) ABSTRACT

A magnetic head actuator includes a head-holding substrate having a pair of movable arms for clamping a magnetic head, and piezoelectric elements fixed along the pair of movable arms to move the pair of movable arms in response to an applied voltage. The head-holding substrate comprises a fired glass-ceramic compact containing at least one of $SiO_2$, $B_2O_3$, and $Al_2O_3$. The piezoelectric elements are formed on the head-holding substrate with a piezoelectric material by printing and low-temperature firing.

15 Claims, 4 Drawing Sheets

MAGNETIC HEAD ACTUATOR INCLUDING PIEZOELECTRIC ELEMENTS FIXED TO THE ARMS OF A FIRED GLASS-CERAMIC SUBSTRATE

This application claims the benefit of Japanese Patent Application No.: 2003-030258, filed on Feb. 7, 2003, which is incorporated herein by reference.

BACKGROUND OF THE INVENTION

1. Field of the Invention

The present invention relates to magnetic head actuators for fine adjustment to the position of a magnetic head, and manufacturing methods for the same.

2. Description of the Related Art

In the development of hard disc drives, tracks have been made narrower to achieve higher storage capacity and higher recording density. Such narrower tracks make it difficult for known servo control techniques with a voice coil motor alone to position a magnetic head accurately over the tracks. In recent years, a wide variety of hard disc drives have been developed that include a magnetic head (slider) equipped with an actuator to assist the voice coil motor to position the magnetic head more precisely.

Such magnetic head actuators include, for example, a head-holding substrate having a pair of movable arms for clamping a magnetic head, and a pair of piezoelectric elements fixed along the movable arms. These piezoelectric elements move the movable arms in response to an applied voltage.

In one known type of magnetic head actuator, the head-holding substrate and the piezoelectric elements are made of lead zirconate titanate (PZT), which is a piezoelectric material. This type of magnetic head actuator preferably includes a head-holding substrate made of a composite of PZT layers so that the magnetic head actuator can operate at low voltage. This head-holding substrate, however, requires an internal electrode so that the PZT layers can conduct electricity. Because the PZT layers and the inner electrode have low adhesion strength, thinner PZT layers decrease the mechanical strength of the composite. In addition, the head-holding substrate and the piezoelectric elements are readily chipped and cracked even in normal use because PZT is a fragile material (low mechanical strength). During long-term operation, PZT particles readily separate from the head-holding substrate and the piezoelectric elements, particularly from cut or ground surfaces of the head-holding substrate. According to Japanese Unexamined Patent Application Publication No. 2002-74871, for example, the head-holding substrate may be entirely coated with a fluorinated coating agent to prevent the separation of particles. However, coating individual head-holding substrates with a coating agent is difficult and undesirable from a manufacturing viewpoint.

In another type of magnetic head actuator, the head-holding substrate is made of a ceramic such as zirconia while the piezoelectric elements comprise PZT. Unfortunately, for this type of actuator, the head-holding substrate is deformed during firing because ceramics such as zirconia have high sintering temperatures (about 1500° C.) and this deformation causes difficulty in achieving the necessary dimensional accuracy. Therefore, this type of magnetic head actuator has not been put to practical use.

SUMMARY OF THE INVENTION

Accordingly, an advantage of the present invention is that it provides a magnetic head actuator that can prevent the separation of particles and that has sufficient mechanical strength. Its manufacturing method is also disclosed.

The present invention features glass-ceramic materials, which can be sintered at low temperature with minimal shrinkage and can be micromachined in the green sheet state. The term glass-ceramic materials as used herein refers to mixtures of glass and ceramics.

The present invention provides a magnetic head actuator comprising a head-holding substrate having a pair of movable arms for holding a magnetic head, and a pair of piezoelectric elements fixed along the pair of movable arms to move the pair of movable arms slightly in response to an applied voltage, wherein the head-holding substrate comprises a fired glass-ceramic compact and all surfaces of the substrate have been fired.

The fired glass-ceramic compact preferably contains at least one of $SiO_2$, $B_2O_3$, and $Al_2O_3$. Such a fired glass-ceramic compact may have a mechanical strength of 200 MPa or more. Examples of such fired glass-ceramic compacts include a compact containing a glass component comprising PbO, $B_2O_3$, $SiO_2$, CaO, and a ceramic component comprising $Al_2O_3$; a compact containing a glass component comprising MgO, $Al_2O_3$, $SiO_2$, $B_2O_3$, and a ceramic component comprising $SiO_2$; a compact containing a glass component comprising $B_2O_3$, $SiO_2$, and and a ceramic component comprising $Al_2O_3$; CaO, $Al_2O_3$, and $SiO_2$; and a compact containing a glass component comprising $Li_2O$, $SiO_2$, MgO, $Al_2O_3$, and a ceramic component comprising $SiO_2$, and $Al_2O_3$. A head-holding substrate made of such a fired glass-ceramic compact is not easily chipped or cracked and can prevent the separation of particles even in long-term operation.

Preferably, the piezoelectric elements are formed on the head-holding substrate by printing and are fired at a lower temperature than the sintering temperature of the fired glass-ceramic compact. The piezoelectric elements can be formed by printing in narrow areas on the head-holding substrate. In addition, low-temperature firing can prevent the separation of particles from the piezoelectric elements and a decrease in the mechanical strength of the fired glass-ceramic compact. These piezoelectric elements are preferably made of a piezoelectric material having a lower sintering temperature than the fired glass-ceramic compact, for example, PZT.

The present invention also provides a method for manufacturing a magnetic head actuator, comprising: preparing a glass-ceramic green sheet; processing the glass-ceramic green sheet into a desired shape; firing the glass-ceramic green sheet by non-shrinkage firing to provide a fired glass-ceramic sheet for head-holding substrates, all surfaces of the fired glass-ceramic sheet being fired; forming a pair of piezoelectric elements on each head-holding substrate by printing with a piezoelectric material having a lower sintering temperature than that of the fired glass-ceramic sheet; and firing the pair of piezoelectric elements at a lower temperature than the sintering temperature of the fired glass-ceramic sheet.

The present invention uses a glass-ceramic green sheet to prepare the head-holding substrates. The shape and size of the head-holding substrates can be accurately and readily determined by laser processing or pressing. In addition, the glass-ceramic green sheet can be fired by non-shrinkage firing to provide a fired glass-ceramic sheet having the same shape and size (except the thickness) as before the firing. Therefore, head-holding substrates having a desired shape and size can be readily defined in such a fired glass-ceramic sheet.

The glass-ceramic green sheet is preferably made of a glass-ceramic material powder containing at least one of $SiO_2$, $B_2O_3$, and $Al_2O_3$. Using such a glass-ceramic green sheet, the fired glass-ceramic sheet may have a mechanical strength of 200 MPa or more.

Examples of the composition of such a fired glass-ceramic sheet include a sheet containing a glass component comprising PbO, $B_2O_3$, $SiO_2$, CaO, and a ceramic component comprising $Al_2O_3$; a sheet containing a glass component comprising MgO, $Al_2O_3$, $SiO_2$, $B_2O_3$, and a ceramic component comprising $SiO_2$; a sheet containing a glass component $B_2O_3$, $SiO_2$, and and a ceramic component comprising $Al_2O_3$; a sheet comprising CaO, $Al_2O_3$, and $SiO_2$; and a sheet containing a glass component comprising $Li_2O$, $SiO_2$, MgO, $Al_2O_3$, and a ceramic component comprising $SiO_2$, and $Al_2O_3$. The piezoelectric elements are preferably made of a piezoelectric material having a lower sintering temperature than the fired glass-ceramic compact. If, for example, the sintering temperature of the fired glass-ceramic compact is about 900° C., the piezoelectric elements are preferably made of PZT, which can be sintered at about 850° C.

In the step of processing the glass-ceramic green sheet into a desired shape, openings are preferably formed in the glass-ceramic green sheet by laser processing or pressing to define the shape of the head-holding substrates. These openings, for example, define a stationary portion of each head-holding substrate and a pair of movable arms that extend from both ends of each stationary portion to hold a magnetic head at free ends of the movable arms. Laser processing or pressing allows finer processing.

Preferably, to improve the manufacturing efficiency, many head-holding substrates are defined in the fired glass-ceramic sheet at the same time and, before the step of firing the pair of piezoelectric elements, the fired glass-ceramic sheet is cut to separate the head-holding substrates. According to this method, the piezoelectric elements and cut surfaces of the head-holding substrates are fired after the separation of the head-holding substrates. This method, therefore, provides head-holding substrates of which all surfaces have been fired, thus preventing the separation of particles from both the head-holding substrate and the piezoelectric elements and a resultant malfunction in a hard disc drive due to the separation of particles. This contributes to improvements in the reliability of the hard disc drive.

DESCRIPTION OF THE PREFERRED EMBODIMENTS

Figure 1:
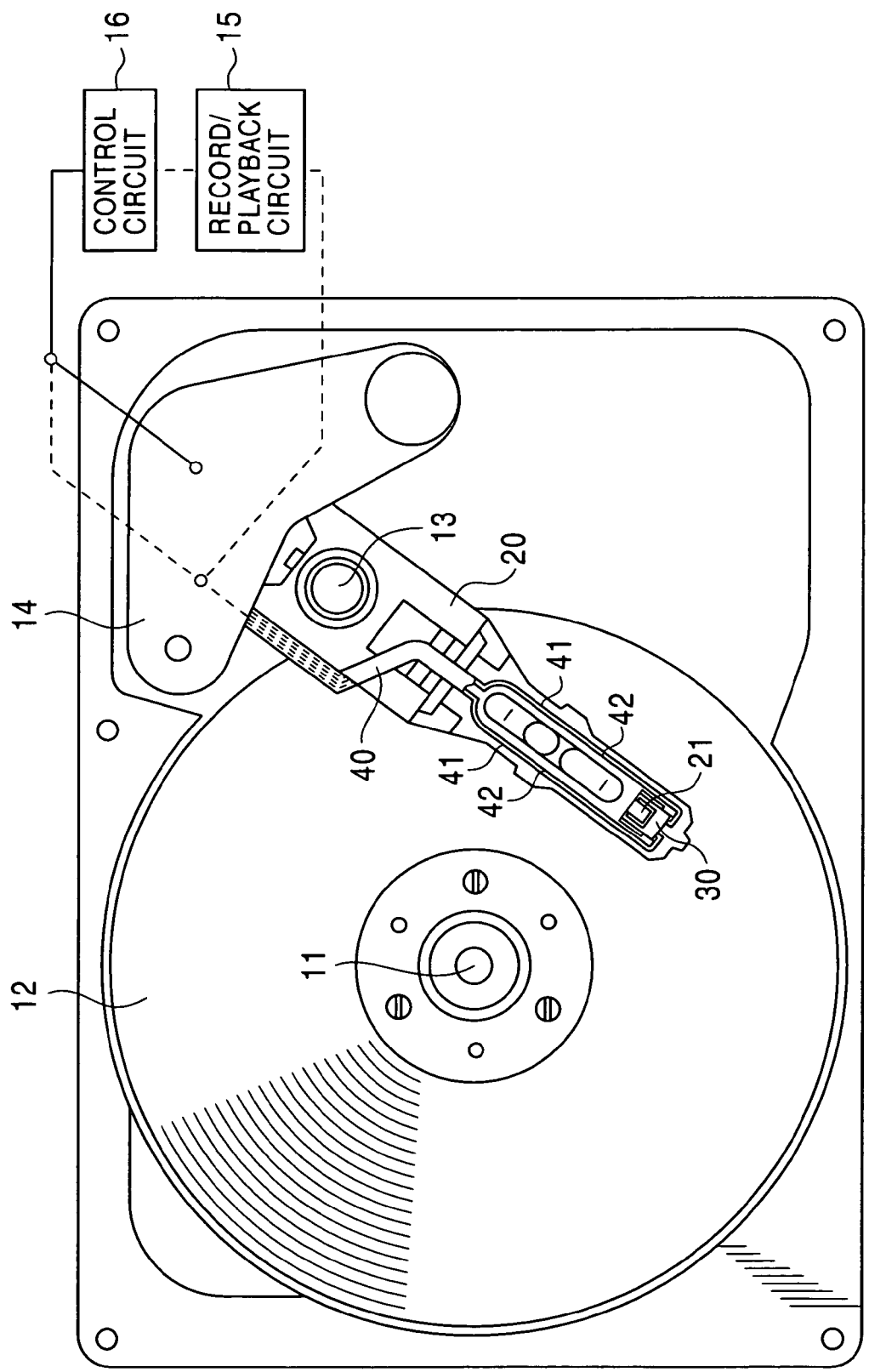
FIG. 1 is a plan view of a hard disc drive including a magnetic head actuator of the present invention.
Figure 2:
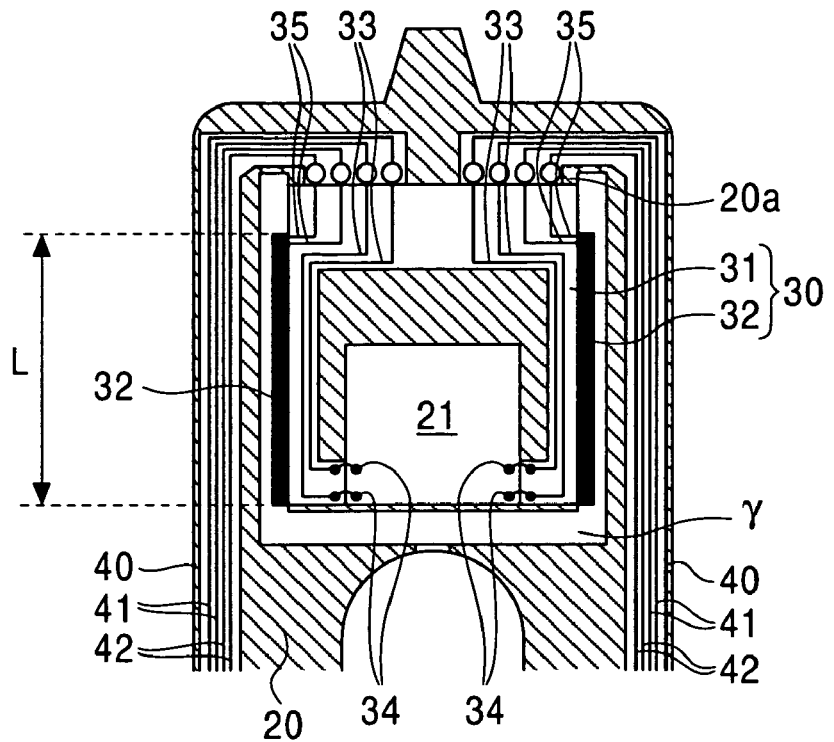
FIG. 2 is an enlarged plan view of the magnetic head actuator and its surroundings in FIG. 1.

FIG. 1 shows the overall structure of a hard disc drive including a magnetic head actuator 30 according to the present invention. A hard disc 12 (a magnetic disc) rotates around a rotating shaft 11. A coarse adjustment shaft 13 beside the hard disc 12 supports the base of a swing arm 20 (a load beam or a gimbal blade), which is pivotable around the coarse adjustment shaft 13. Referring then to FIG. 2, a space γ defines a tongue portion 20a at the leading end of the swing arm 20. The tongue portion 20a holds a magnetic head 21 (a slider or a flexure). The swing arm 20 is elastic so as to support the magnetic head 21 flexibly at the tongue portion 20a. Referring back to FIG. 1, when an actuator 14 pivots the swing arm 20 around the coarse adjustment shaft 13, the magnetic head 21 reciprocates substantially along the radius of the hard disc 12.

Figure 3:
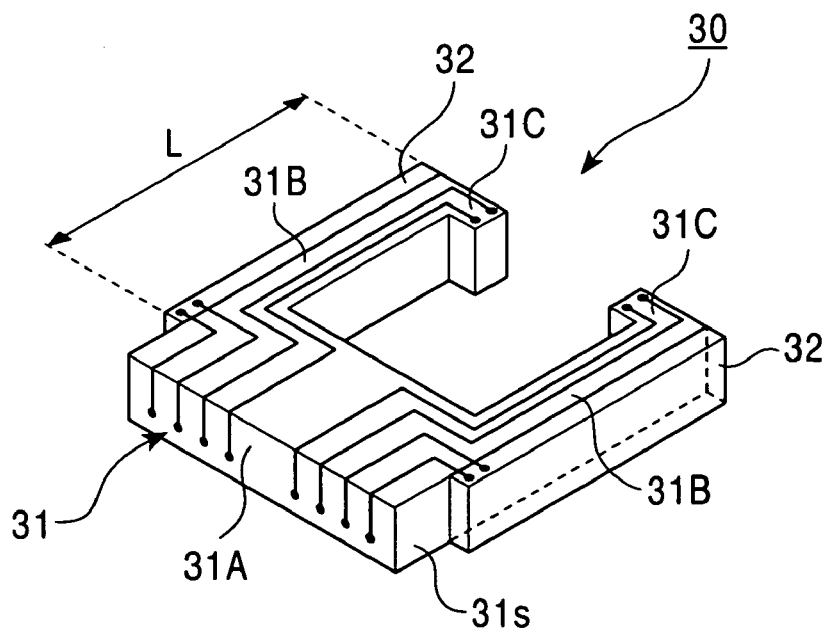
FIG. 3 is a perspective view of the magnetic head actuator alone in FIG. 1.

Additionally, the tongue portion 20a holds the magnetic head actuator 30 for fine adjustment to the position of the magnetic head 21. Referring to FIGS. 2 and 3, the magnetic head actuator 30 includes a head-holding substrate 31 composed of a stationary portion 31A and a pair of movable arms 31B. The stationary portion 31A is bonded to the tongue portion 20a. The movable arms 31B extend in parallel from both ends of the stationary portion 31A in a direction perpendicular to the stationary portion 31A (in a direction from the magnetic head 21 to the coarse adjustment shaft 13 in FIG. 1). These movable arms 31B hold the magnetic head 21 at their free ends 31C.

The head-holding substrate 31 is made of a fired glass-ceramic compact containing at least one of $SiO_2$, $B_2O_3$, and $Al_2O_3$ to provide a mechanical strength of about 200 MPa or more. A flexure strength of 200 MPa or more can prevent chipping and cracking of the attenuator more effectively, compared to a head-holding substrate of a PZT piezoelectric laminate.

The head-holding substrate 31 has a pair of piezoelectric elements 32. These piezoelectric elements 32 are disposed along the outer side surfaces of the movable arms 31B such that the piezoelectric elements 32 have opposite polarities. When a voltage is applied to the piezoelectric elements 32, a length L (in the direction from the magnetic head 21 to the coarse adjustment shaft 13 in FIG. 1) of one piezoelectric element 32 increases while the length L of the other piezoelectric element 32 decreases. The piezoelectric elements 32 of this embodiment are formed on the head-holding substrate 31 with PZT, which has a lower sintering temperature than the fired glass-ceramic compact for the head-holding substrate 31, by printing and low-temperature firing. In FIG. 2, the piezoelectric elements 32 are illustrated as filled with black color and the swing arm 20 is hatched, for clarity.

One piezoelectric element 32 expands and the other contracts to move the movable arms 31B (the magnetic head 21) slightly along an arc around the coarse adjustment shaft 13. The piezoelectric elements 32, if expanding and contracting by, for example, 0.3 μm, may move the magnetic head 21 by about 1 μm.

Lines 33 for connecting the magnetic head 21 (two on each of the left and right sides for an example shown in FIG. 2) and lines 35 for connecting the piezoelectric elements 32 (two on each of the left and right sides for the example shown in FIG. 2) are printed on the top surface of the head-holding substrate 31. One terminal of each line 33 is connected to the free end of either movable arm 31 while the other terminal is connected to a flexible wiring board 40 through an end face of the stationary portion 31A. On the other hand, one terminal of each line 35 is connected to the top surface (or the bottom surface) of either piezoelectric element 32 while the other terminal is connected to the flexible wiring board 40 through the end face of the stationary portion 31A. In this embodiment, the terminals of the lines 33 to the magnetic head 21 may be connected through wires 34 by wire bonding while the other terminals of the lines 33 and 35 may be connected to the flexible wiring board 40 by ball bonding.

The flexible wiring board 40 has trace lines 41 and feed lines 42. One terminal of each trace line 41 is connected to the magnetic head 21 through the lines 33 on the head-holding substrate 31 while the other terminal is connected to a record/playback circuit 15. On the other hand, one terminal of each feed line 42 is connected to either piezoelectric element 32 through the lines 35 on the head-holding substrate 31 while the other terminal may be connected to a control circuit 16. The control circuit 16 may be connected to the actuator 14, the magnetic head 21, and the record/playback circuit 15 to control the overall hard disc drive. That is, the control circuit 16 may control the magnetic head 21 and the record/playback circuit 15 to communicate record/playback signals; on the other hand, the control circuit 16 may drive the actuator 14 and the magnetic head actuator 30 (the piezoelectric elements 32) to adjust the tracking position of the magnetic head 21 according to tracking signals read from the hard disc 12 by the magnetic head 21.

The magnetic head actuator 30 is characterized in that the head-holding substrate 31 is made of the fired glass-ceramic compact; that the piezoelectric elements 32 are made of a piezoelectric material that can be sintered at low temperature; and that the piezoelectric elements 32 are formed by printing and firing.

A method for manufacturing the magnetic head actuator 30 in FIG. 3 will now be described with reference to FIGS. 4 to 7.

Figure 4:
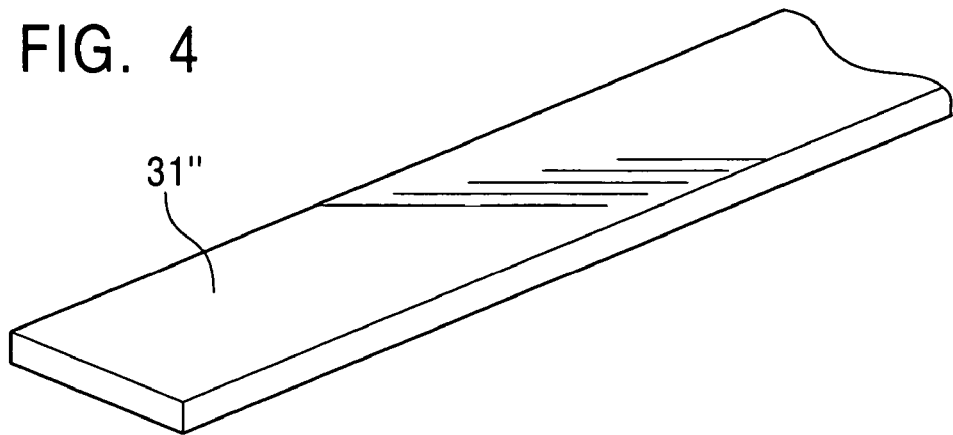
FIG. 4 illustrates a step of a method for manufacturing the magnetic head actuator in FIG. 3.

A glass-ceramic material powder is mixed with an organic binder and a solvent to prepare a thin sheet (a glass-ceramic green sheet 31") in FIG. 4. This glass-ceramic green sheet 31" has a thickness such that it becomes about 0.25 mm after firing.

The glass-ceramic green sheet 31" is preferably made of a glass-ceramic material containing at least one of $SiO_2$, $B_2O_3$, and $Al_2O_3$ to provide a mechanical strength of about 200 MPa or more after firing. Table 1 shows examples of the composition of the glass-ceramic material.

TABLE 1

Examples of the Composition of the Glass-Ceramic Material

| Example | Composition |
|---|---|
| 1 | glass component ($PbO + B_2O_3 + SiO_2 + CaO$) + ceramic component ($Al_2O_3$) |
| 2 | glass component ($MgO + Al_2O_3 + SiO_2 + B_2O_3$) + ceramic component ($SiO_2$) |
| 3 | glass component ($B_2O_3 + SiO_2$) + ceramic component ($Al_2O_3$) |
| 4 | $CaO + Al_2O_3 + SiO_2$ |
| 5 | $B_2O_3 + SiO_2 + Al_2O_3 + (2MgO \cdot SiO_2)$ |
| 6 | glass component ($Li_2O + SiO_2 + MgO + Al_2O_3$) + ceramic component ($SiO_2 + Al_2O_3$) |

Figure 5:
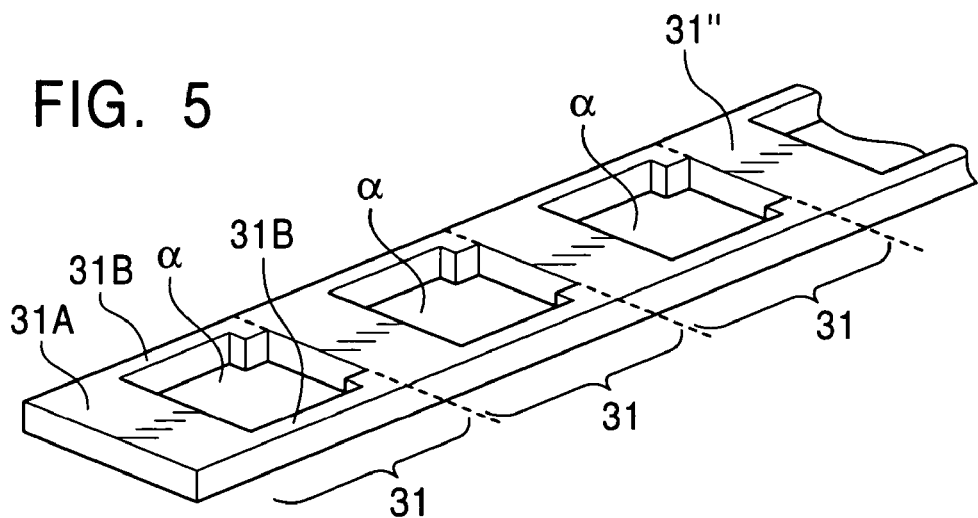
FIG. 5 illustrates another step of a method for manufacturing the magnetic head actuator in FIG. 3.

Referring then to FIG. 5, the glass-ceramic green sheet 31" is processed into a desired shape. Specifically, many openings a are formed in the glass-ceramic green sheet 31" by laser processing or pressing to define the shape of the head-holding substrate 31. Micromachining with lasers allows the openings α to have an accurate shape. In this embodiment, many magnetic head actuators 30 are prepared from the glass-ceramic green sheet 31".

The glass-ceramic green sheet 31" is then fired at about 900° C. by non-shrinkage firing, which is a known method for firing the glass-ceramic green sheet 31" with no longitudinal and lateral shrinkage. This firing step produces a fired glass-ceramic sheet 31' of which all surfaces (the top, bottom, and side surfaces) are fired. This fired glass-ceramic sheet 31' includes many head-holding substrates 31 composed of the stationary portion 31A and the movable arms 31B extending from both ends of the stationary portion 31A to hold the magnetic head 21.

Figure 6:
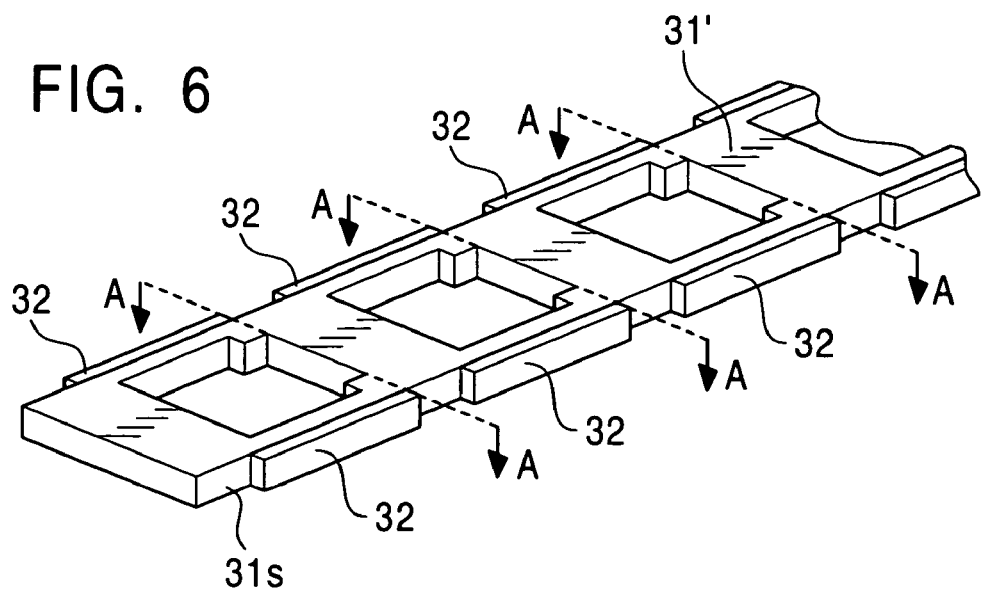
FIG. 6 illustrates yet another step of a method for manufacturing the magnetic head actuator in FIG. 3; and, FIG. 7 illustrates still another step of a method for manufacturing the magnetic head actuator in FIG. 3.

Referring then to FIG. 6, the pair of piezoelectric elements 32 are formed in parallel by printing on both side surfaces 31s of each head-holding substrate 31 defined in the fired glass-ceramic sheet 31'. These piezoelectric elements 32 have a thickness such that they become about 10 to 40 μm after firing. In this embodiment, the piezoelectric elements 32 are disposed such that the piezoelectric elements 32 have opposite polarities. When a voltage is applied to the piezoelectric elements 32, one piezoelectric element 32 expands and the other piezoelectric element 32 contracts. These piezoelectric elements 32 are preferably made of a piezoelectric material having a lower sintering temperature than the fired glass-ceramic sheet 31'. In particular, the piezoelectric elements 32 are preferably made of a piezoelectric material that can be sintered at about 850° C.

Figure 7:
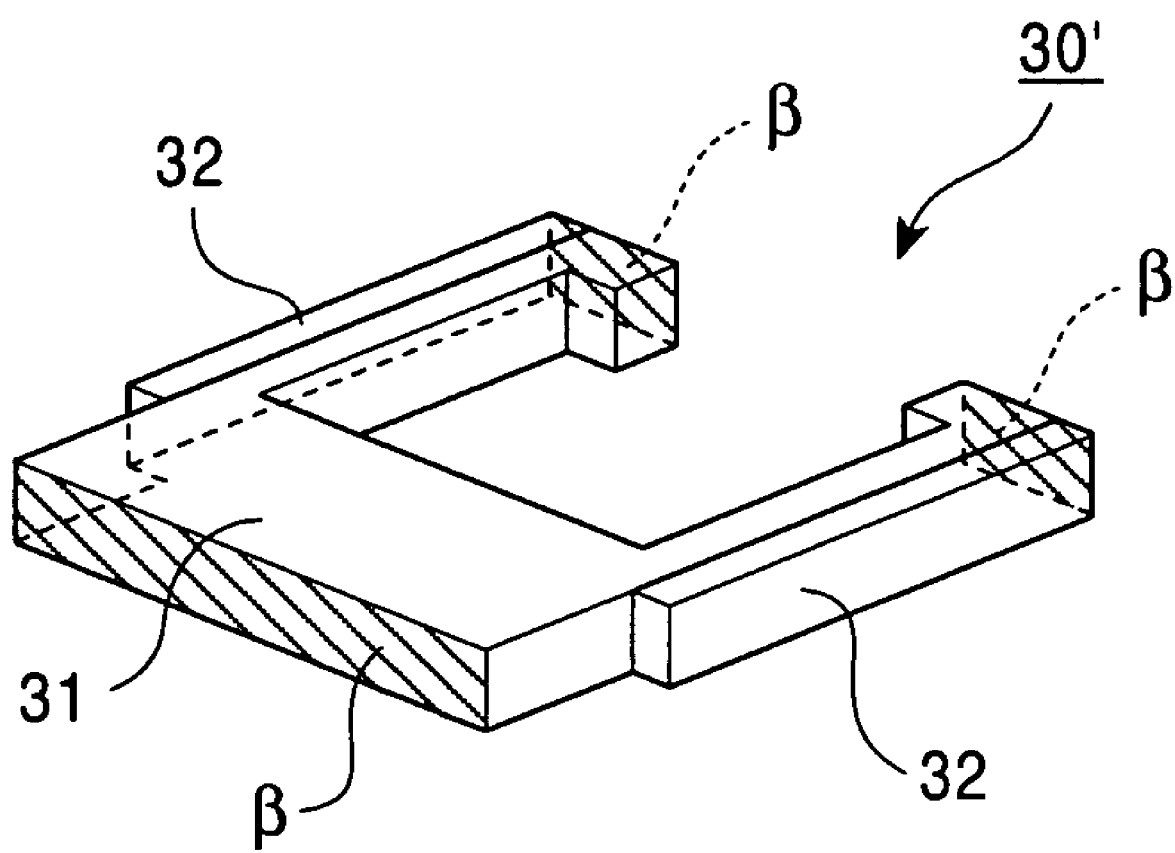

The fired glass-ceramic sheet 31' is then cut along cutting lines A-A in FIG. 6 to provide individual magnetic head actuators 30'. Referring to FIG. 7, the head-holding substrate 31 of each magnetic head actuator 30' (except for two magnetic head actuators 30' separated from both ends of the fired glass-ceramic sheet 31') has three cut surfaces β, which are hatched in FIG. 7.

The magnetic head actuators 30' are fired at low temperature to sinter the piezoelectric elements 32 and the cut surfaces β of the head-holding substrates 31. As described above, the head-holding substrates 31 are made of the fired glass-ceramic sheet 31', which is the glass-ceramic green sheet 31" fired that has been fired at about 900° C. The fired glass-ceramic sheet 31' tends to decrease its strength after the second firing. To minimize such a decrease in the strength of the head-holding substrates 31, therefore, the magnetic head actuators 30' are preferably fired at a lowest possible temperature. In this embodiment, the magnetic head actuators 30' are fired at about 850° C. After the second firing, all exposed surfaces including the cut surfaces β of the head-holding substrates 31 have been fired.

Subsequently, the lines 33 (four in this embodiment) and the lines 35 (four in this embodiment) are printed on the top surfaces of the head-holding substrates 31. The lines 35 are formed such that one terminal of each line 35 is electrically connected to the top or bottom surface of either piezoelectric element 32, producing the magnetic head actuator in FIG. 3.

The magnetic head actuator 30 holds the magnetic head 21 with the free ends 31C of the movable arms 31B. The stationary portion 31A of the magnetic head actuator 30 is bonded to the tongue portion 20a of the swing arm 20. One terminal of each line 33 may be connected to the magnetic head 21 by wire bonding while the other terminal may be connected to one trace line 41 of the flexible wiring board 40 by ball bonding. The other terminal of each line 35 may be connected to one feed line 42 of the flexible wiring board 40 by ball bonding. The hard disc drive including the magnetic head actuator 30 is shown in FIG. 1.

The present invention is not limited to the illustrated embodiment and may be modified within the scope of the present invention.

What is claimed is:

1. A magnetic head actuator comprising:
    a head-holding substrate having a pair of movable arms for holding a magnetic head; and
    piezoelectric elements fixed along the pair of movable arms to move the pair of movable arms in response to an applied voltage,
    wherein the head-holding substrate comprises a fired glass-ceramic compact and all surfaces of the substrate are fired,
    wherein the fired glass-ceramic compact has a mechanical strength of 200 MPa or more, and
    wherein the fired glass-ceramic compact has a glass component comprising PbO, $B_2O_3$, $SiO_2$, CaO, and a ceramic component comprising $Al_2O_3$.

2. A magnetic head actuator according to claim 1, wherein the piezoelectric elements are formed on the head-holding substrate by printing and are fired at a lower temperature than the sintering temperature of the fired glass-ceramic compact.

3. A magnetic head actuator according to claim 2, wherein the piezoelectric elements comprise PZT.

4. A magnetic head actuator comprising:
    a head-holding substrate having a pair of movable arms for holding a magnetic head; and
    piezoelectric elements fixed along the pair of movable arms to move the pair of movable arms in response to an applied voltage,
    wherein the head-holding substrate comprises a fired glass-ceramic compact and all surfaces of the substrate are fired,
    wherein the fired glass-ceramic compact has a mechanical strength of 200 MPa or more, and
    wherein the fired glass-ceramic compact has a glass component comprising MgO, $Al_2O_3$, $SiO_2$, $B_2O_3$, and a ceramic component comprising $SiO_2$.

5. A magnetic head actuator according to claim 4, wherein the piezoelectric elements are formed on the head-holding substrate by printing and are fired at a lower temperature than the sintering temperature of the fired glass-ceramic compact.

6. A magnetic head actuator according to claim 5, wherein the piezoelectric elements comprise PZT.

7. A magnetic head actuator comprising:
    a head-holding substrate having a pair of movable arms for holding a magnetic head; and
    piezoelectric elements fixed along the pair of movable arms to move the pair of movable arms in response to an applied voltage,
    wherein the head-holding substrate comprises a fired glass-ceramic compact and all surfaces of the substrate are fired,
    wherein the fired glass-ceramic compact has a mechanical strength of 200 MPa or more, and
    wherein the fired glass-ceramic compact has a glass component comprising $B_2O_3$, $SiO_2$, and a ceramic component comprising $Al_2O_3$.

8. A magnetic head actuator according to claim 7, wherein the piezoelectric elements are formed on the head-holding substrate by printing and are fired at a lower temperature than the sintering temperature of the fired glass-ceramic compact.

9. A magnetic head actuator according to claim 8, wherein the piezoelectric elements comprise PZT.

10. A magnetic head actuator comprising:
    a head-holding substrate having a pair of movable arms for holding a magnetic head; and
    piezoelectric elements fixed along the pair of movable arms to move the pair of movable arms in response to an applied voltage,
    wherein the head-holding substrate comprises a fired glass-ceramic compact and all surfaces of the substrate are fired,
    wherein the fired glass-ceramic compact has a mechanical strength of 200 MPa or more, and
    wherein the fired glass-ceramic compact comprises CaO, $Al_2O_3$, and $SiO_2$.

11. A magnetic head actuator according to claim 10, wherein the piezoelectric elements are formed on the head-holding substrate by printing and are fired at a lower temperature than the sintering temperature of the fired glass-ceramic compact.

12. A magnetic head actuator according to claim 11, wherein the piezoelectric elements comprise PZT.

13. A magnetic head actuator comprising:
    a head-holding substrate having a pair of movable arms for holding a magnetic head; and
    piezoelectric elements fixed along the pair of movable arms to move the pair of movable arms in response to an applied voltage,
    wherein the head-holding substrate comprises a fired glass-ceramic compact and all surfaces of the substrate are fired,
    wherein the fired glass-ceramic compact has a mechanical strength of 200 MPa or more, and
    wherein the fired glass-ceramic compact has a glass component comprising $Li_2O$, $SiO_2$, MgO, $Al_2O_3$, and a ceramic component comprising $SiO_2$ and $Al_2O_3$.

14. A magnetic head actuator according to claim 13, wherein the piezoelectric elements are formed on the head-holding substrate by printing and are fired at a lower temperature than the sintering temperature of the fired glass-ceramic compact.

15. A magnetic head actuator according to claim 14, wherein the piezoelectric elements comprise PZT.

* * * * *